3,497,476
ACRYLONITRILE COPOLYMERS CONTAINING SULFONIC ACID AMIDE GROUPS AND A PROCESS FOR THEIR PRODUCTION
Jeno Szita, Dormagen, Ulrich Bahr, Opladen-Lutzenkirchen, Herbert Marzolph and Gunther Nischk, Dormagen, and Carlhans Suling, Leverkusen, Germany, assignors to Farbenfabriken Bayer Aktiengesellschaft, Leverkusen, Germany, a corporation of Germany
No Drawing. Filed Nov. 30, 1967, Ser. No. 686,814
Claims priority, application Germany, Dec. 5, 1966, F 50,850
Int. Cl. C08f *15/38*
U.S. Cl. 260—79.3          14 Claims

ABSTRACT OF THE DISCLOSURE

The invention relates to acrylonitrile copolymers containing copolymerized N-(amidosulfonyl)-sulfonic acid amides of the general formula

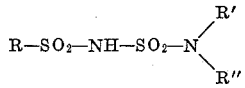

wherein R is an aliphatic, aromatic or araliphatic radical containing at least one copolymerizable olefinic double bond, R' and R" are lower aliphatic radicals or R' and R" together with the N-atom form a heterocyclic ring, which can be produced by copolymerizing acrylonitrile, said N-(amidosulfonyl)-sulfonic acid amides and optionally one or more additional comonomers in a liquid medium in the presence of a radical-forming catalyst.

---

This invention relates to acrylonitrile copolymers containing sulfonic acid amide groups and to a process for their production.

It is known that the affinity for basic dyes of filaments obtained from acrylonitrile polymers can be increased by copolymerizing acrylonitrile with comonomers containing carboxyl, sulfo or disulfonimide groups. Unfortunately, copolymers containing carboxyl groups show a marked tendency to turn yellow at elevated temperatures, which must be regarded as a significant disadvantage. In the preparation of comonomers containing sulfo groups the comonomers are usually obtained as alkali metal salts. The use of these compounds in the form of their salts in the solution polymerization of acrylonitrile in conventional organic solvents for polyacrylonitrile generally presents considerable difficulties. Due to their poor solubility in the reaction medium, narrow limits are imposed on the quantities in which they can be used. In addition, the tendency which the resulting solution has to gel is increased and its spinning properties are thus impaired by the undissolved particles and salt deposits. The use of these compounds in the form of free acids involves additional operations which are expensive to carry out on a large scale. Some of the unsaturated aromatic disulfonamides which have also been proposed are only soluble in water in relatively low concentrations (for example methacrylamidobenzene benzene disulfimide: 0.9% at 25° C.) thus complicating polymerization on a large scale in an aqueous medium, particularly in cases where fairly large quantities of disulfonimide are used. Considerable difficulties are also involved in the production of these compounds on an industrial scale with the necessary degree of purity. To increase the hydrophilic properties or the swellability of an acrylonitrile polymer in water, relatively large quantities of disulfonimide comonomers have to be incorporated in the macromolecule.

In addition to physical properties such as tensile strength and elongation under a variety of conditions, the colour of the untreated fabric, the fastness to light of the fibres and the wear properties of the dyed fabric are all important criteria in the performance of textile fibres. For example, it is known that the whiteness of acrylic fibres can be improved by carrying out the polymerization stage, i.e. the production of the raw fibres, with particular care. For this reason, polymerization is carried out at pH values below 7, for example, and at temperatures below 65° C., using redox systems as polymerization initiators. Redox systems containing persulfates as the oxidation component and bisulfites as the reduction component have proved to be particularly effective in initiating polymerization. The best results have been obtained with these systems by using the reduction component, i.e. compounds such as $SO_2$ or alkali metal bisulfites or pyrosulfites, in a large molar excess relatively to the oxidation component, i.e., according to an earlier proposal, polymers with the most favourable properties are supposed to be obtained by using an at least tenfold excess (by weight) of the reduction component.

One disadvantage of this process is that very large quantities of salts are present in the polymerization mixture with the result that the polymers are formed in a particularly finely divided state and can only be worked up, i.e. filtered and dried, at the expense of losses.

In addition, the extremely large amounts of $SO_2$ or bisulfite in the polymerization mother liquors mean that special precautions have to be taken during working up to deactivate the toxic $SO_2$ in the effluents. All the apparatus used in industry to treat effluents are particularly expensive because several industrial materials are particularly sensitive to corrosion under the effect of $SO_2$ in the presence of water, i.e., $H_2SO_3$, rather than just dry $SO_2$ comes into contact with them.

It is an object of this invention to provide acrylonitrile copolymers which avoid the afore-mentioned difficulties and which have an improved affinity for basic dyes and valuable properties, such as better hydrophily, high thermal stability and a limited tendency towards yellowing in concentrated solution.

It is another object of this invention to provide a process for the production of such acrylonitrile copolymers. This is accomplished by acrylonitrile copolymers consisting of at least 50% copolymerized acrylonitrile, 0.5 to 8% of a copolymerized N'-substituted N-(amidosulfonyl)-sulfonic acid amide of the general formula

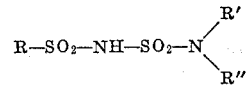

wherein R is an aliphatic, aromatic or araliphatic radical containing at least one copolymerizable olefinic double bond, R' and R" are lower aliphatic radicals or R' and R" together with the N-atom form a heterocyclic ring, the balance being one or more additional copolymerized comonomers. The acrylonitrile copolymers are produced according to the invention by a process which comprises copolymerizing at least 50% acrylonitrile with from 0.5 to 8% based on the total amount of monomers of and N'-substituted N-(amidosulfonyl)-sulfonic acid amide corresponding to the general formula

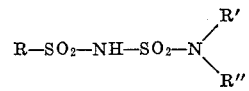

wherein R represents an aliphatic, aromatic or aliphatic radical with at least one copolymerizable olefinic double bond, and R' and R" represent lower aliphatic radicals or R and R' together with the N-atom form a heterocyclic ring, the balance being one or more additional copolymerizable monomers, said copolymerizing being effected in a liquid medium in the presence of a radical forming catalyst at a temperatures from 10 to 70° C.

Although it is known that acrylonitrile polmers can be modified by incorporating in them a variety of comonomers to improve their solubility, the effect of the novel comonomers according to the invention which contain a particularly effective functional group is that, on the one hand, the copolymers show all the properties which are so important to the production of acrylic fibres whilst, on the other hand, an excess by weight of the reduction component of the redox system as low as about 5-fold is sufficient during polymerization to obtain polymers with improved whiteness. At the same time, the novel functional groups of the comonomers according to the invention provide the filaments and fibres obtained from the polymers with a high affinity for dyse.

The N'-substituted N-(amidosulfonyl)-sulfonic acid amides which may be used for copolymerization correspond to the general formula

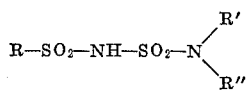

wherein R represents an aliphatic, aromatic or araliphatic radical with at least one copolymerizable olefinic double bond, and R' and R" represent lower aliphatic radicals or R and R' together with the N-atom form a heterocyclic ring. The following compounds are mentioned as examples:

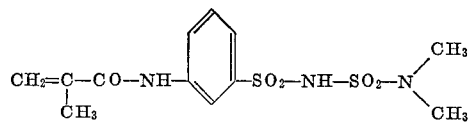

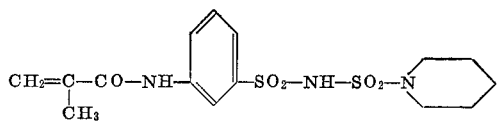

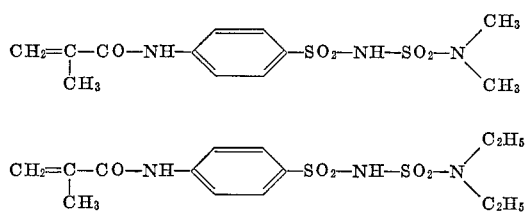

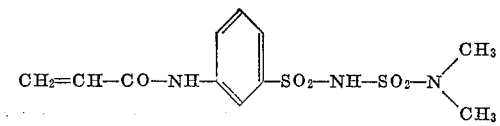

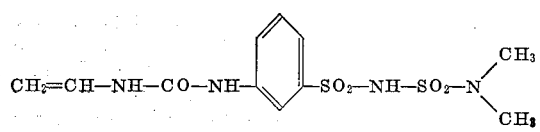

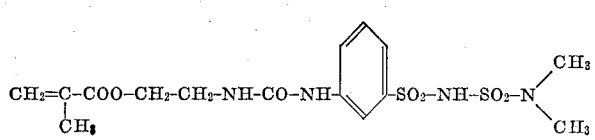

These compounds may be prepared in accordance with some of our earlier proposals either by reacting alkali metal derivatives of sulfonic acid amides corresponding to the formula

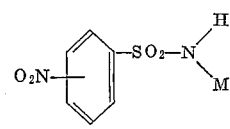

with sulfamic acid halides corresponding to the formula

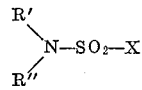

or by reacting alkali metal derivatives of N-substituted sulfonyl diamides corresponding to the general formula

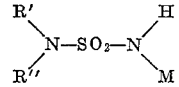

with sulfonic acid chlorides corresponding to the formula

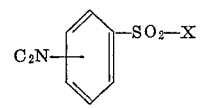

in which R' and R" are as defined above, whilst X=halogen and M=alkali metal, to form,

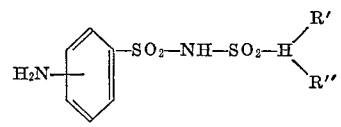

Following the catalytic hydrogen reduction of the nitro group, the amino compound is reacted with olefinically unsaturated acid halides, anhydrides or isocyanates.

The aforementioned compounds are readily soluble both in water and in organic solvents such as lower alcohols, acetone, acetonitrile, tetrahydrofuran, dimethyl formamide, dimethyl acetamide, dimethyl sulfoxide, glycol carbonate and butyrolactone. They can be converted into polymers with a strongly acid character in the aforementioned solvents, for example with the aid of radical-forming catalysts. For copolymerization with acrylonitrile, the compounds described may be used either as free acids or as salts soluble in the reaction medium. It is preferred to use the free acids formed during preparation for the purposes of this invention.

One particular advantage of the process is that the copolymerization of acrylonitrile even with fairly large quantities of acid comonomers, may be carried out without any difficulties both in aqueous media and in organic solvents by virtue of the high solubility of these compounds in the reaction mixture. Another advantage over unsaturated sulfonic acid salts is that spinning solutions which are totally devoid of salts and which are therefore more stable to gelation, showing greatly reduced viscosities, are obtained by solution polymerization. It is possible in this way to increase the concentration of the spinning solutions by a few percent.

The quantity in which the aforementioned comonomers are incorporated into the acrylonitrile polymer is governed primarily by the purpose for which the end product is to be used, but also by the type of polymerization, the catalysts used and so on. Catalyst systems (redox systems, e.g., persulphate/bisulphite) which yield terminal groups combining cationic dyes are generally used in cases where polymerization is carried out in an aqueous medium. If it is intended to use the copolymers for the production of fibres and filaments, it is usually sufficient in this case to use only 0.5% to 1.0% of the acid comonomers for aqueous polymerization to obtain the dyeability level generally required for practical purposes. In order to obtain special effects, for example, an appreciable increase in the swellability of the polymers, the aforementioned comonomers may be incorporated in the polymer in quantities of from 4% to 8%.

In the solution polymerization of acrylonitrile in organic solvents, for example dimethyl formamide, dimethyl acetamide, dimethyl sulfoxide or ethylene glycol carbonate, more of the acid component is generally required than in aqueous polymerization to obtain the same level of dyeability. In this case, all acid groups have to be incorporated by copolymerization since the catalysts preferably used give neutral terminal groups. The requisite quantity of comonomers containing acid groups is usually between 2% and 3%, based on the total quantity of monomers.

The copolymerization of acrylonitrile with the comonomers used in accordance with the invention is preferably carried out in the presence of other copolymerizable unsaturated compounds. Compounds of this kind are inter alia acrylates and methacrylates, vinyl esters, styrene and its neutral derivatives, vinyl chloride, vinylidene chloride, vinyl bromide, butadiene, chloroprene, acryl- and methacrylamides, vinylalkyl ketones, vinylidene cyanide or divinyl compounds, as well as basic comonomers such as, e.g. vinyl pyridine and its derivatives.

The solubility of the polymers is appreciably increased and the affinity of the resulting fibres for dyes further improved by incorporating in the polymer a third comonomer such as, e.g. methylacrylate, methyl methacrylate, or vinyl acetate. The quantity in which these comonomers are present in the polymer may be between 2% and 10% although it is preferably between 5% and 7%. If it is intended to produce readily dyeable polyacrylic fibres with specific properties, the other co-components will generally be used in a relatively large proportion relatively to the acrylonitrile. If acrylonitrile is copolymerized with 1% to 3% of an ethylenically unsaturated N'-substituted N-(amidosulfonyl)-sulfonamide and for example 25% to 45% of vinylidene chloride, it is possible to obtain highly soluble polymers and highly concentrated spinning solutions. Apart from a high affinity for dyes and good thermostability the fibres spun from these solutions showed a considerably decreased inflammability and combustibility.

Acrylonitrile can be copolymerized with the comonomers by conventional polymerization processes, for example, in aqueous emulsions, dispersions or in solutions. Polymerization in aqueous media is preferably carried out in the absence of emulsifiers using water-soluble, radical-forming catalysts or catalyst systems (redox systems). In this case, copolymerization is carried out either continuously or in batches. The reaction temperature may be in the range from 10 to 70° C., although it is preferably in the range of 40 to 55° C. The pH value of the reaction mixture is between 1 and 6 and preferably between 2.5 and 4.

The degree of polymerization of the resulting polymers can always be controlled very easily during polymerization by varying the quantities in which the individual components are added. The degree of polymerization can be set particularly easily by carrying out polymerization in such a way that around 4.5 to 8 times the quantity of water is present in the reaction medium, based on the amount of monomers used on completion of polymerization, and the reduction component of the redox system is present in a 3- or 5-fold excess. The polymers precipitated are separated from the polymerization mother liquors by filtration and then dried. White powders are obtained which can be converted into filaments of outstanding whiteness. The polymer yields are high and the processing properties of the polymers are excellent.

Radical-forming catalyst systems which are soluble in the organic solvents used are employed for solution polymerization. Examples of catalysts of this kind include azo compounds such as azoisobutyronitrile, inorganic peroxides such as ammonium persulfate, organic hydroperoxides, keto peroxides, acyl peroxides or peresters, redox systems consisting of the aforementioned peroxides and reducing compounds such as, for example, sulfinic acid derivatives. In many cases, it is of advantage to activate the redox initiator system by the addition of concentrated acids such as sulfuric acid, for example.

The concentrations in which the reactants are used are selected in dependence upon the required degrees of polymerization and the conversion rates obtained, in such a way that no polymer can be precipitated during polymerization, whilst the polymer solutions can still be pumped through pipe systems even at temperatures of around 25° C. to 30° C.

The polymerization temperature is variable within a wide range from 0° C. to 100° C. in dependence upon the type of catalysts or solvent used, although polymerization is preferably carried out at temperatures of from 25° C. to 60° C. After the required conversion rate or solution concentration has been reached, polymerization is stopped by the addition of a conventional inhibitor. The solution may then be spun by conventional dry- or wet-spinning processes either directly or after the unreacted monomers have been removed, for example, in a falling-film evaporator under reduced pressure. The spinning solutions thus obtained are colourless or only slightly yellow in colour, clear, salt and gel free, so that they can be further processed without any difficulty. Following removal of unreacted monomers, they may be stored for prolonged periods without any appreciable change in the viscosity of the solutions.

The polymers obtained by aqueous precipitation polymerization can be processed by suitable dissolution processes to give clear, gel free spinning solutions which can be spun without any difficulty. The following examples are to further illustrate the invention without limiting it.

Examples 1–11

A 1.5-litre capacity glass flask equipped with a stirring mechanism, a contact thermometer, a nitrogen inlet and a reflux condenser was used as the polymerization vessel. 900 ml. of desalted water were introduced into the reaction vessel and heated to 55° C. After air had been displaced from the reaction vessel by nitrogen, the desired quantity of acid co-component and acrylonitrile were dissolved. The pH value of the reaction mixture was then adjusted to 3 with 20% sulfuric acid and the catalysts: potassium persulfate and sodium pyrosulfite, each dissolved in 20 ml. of water were added. In cases where the acid co-components were used in fairly large quantities, a small quantity of aluminum sulfate was dissolved in the reaction mixture in order to regulate the grain size of the polymer formed. After 4 hours' reaction at 50° C., polymerization was stopped and the fine-grained polymer was isolated by filtration and then dried in vacuo at 60° C. after repeated washing with desalted water.

Different unsaturated N' - substituted N - (amidosulfonyl)-sulfonic acid amides (acid co-component) were copolymerized with acrylonitrile as described above. The quantities in which the components used are present in the reaction mixture, the yields and the K-values (according to Fikentscher, Cellulose-chemie 13, page 58, 1932) of the polymers formed are set out in Table 1.

TABLE 1

| Example No. | Monomer AN+, g. | Co-component Type | Co-component Grams | Percent by wt. | Catalysts K₂S₂O₈, g. | Catalysts Na₂S₂O₅, g. | Addition, Al₂(SO₄)₃, 18 g. H₂O | Conversion, Percent | K-value |
|---|---|---|---|---|---|---|---|---|---|
| 1 | 69.65 | I | 0.35 | 0.5 | 0.41 | 2.05 | | 83.2 | 85.7 |
| 2 | 69.30 | I | 0.70 | 1.0 | 0.42 | 2.10 | | 85.5 | 83.4 |
| 3 | 68.60 | I | 1.40 | 2.0 | 0.43 | 2.15 | 0.025 | 88.4 | 89.0 |
| 4 | 67.20 | I | 2.80 | 4.0 | 0.44 | 2.20 | 0.035 | 87.9 | 86.7 |
| 5 | 67.80 | I | 4.20 | 6.0 | 0.46 | 2.30 | 0.035 | 89.7 | 90.2 |
| 6 | 67.40 | I | 5.60 | 8.0 | 0.48 | 2.40 | 0.045 | 92.0 | 88.6 |
| 7 | 65.80 | II | 4.20 | 6.0 | 0.45 | 2.25 | 0.035 | 87.2 | 88.0 |
| 8 | 65.80 | III | 4.20 | 6.0 | 0.45 | 2.25 | 0.035 | 79.7 | 84.4 |
| 9 | 65.80 | IV | 4.20 | 6.0 | 0.45 | 2.25 | 0.035 | 83.3 | 86.1 |
| 10 | 65.80 | V | 4.20 | 6.0 | 0.45 | 2.25 | 0.035 | 89.6 | 83.2 |
| 11 | 70.0 | Without comparison | 0 | 0 | 0.40 | 2.00 | 0 | 84.1 | 86.2 |

+ AN = acrylonitrile.

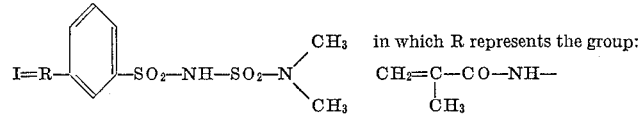

in which R represents the group:

$CH_2=C(CH_3)-CO-NH-$

II = sodium salt of I.

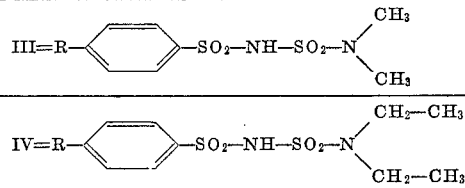

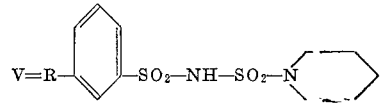

5% solutions in dimethyl formamide were prepared from the polymers obtained and heat-treated at 80° C. in the presence of air. The yellowing of the solutions was periodically measured with an electrophotometer (Type Elko III, a Zeiss product). The extinction values at 470 mμ (crucible 5 cm. thick, comparison solution: pure dimethyl formamide) are set out in Table 2.

The acid groups incorporated in the polymer were detected by potentiometric titration: 1% solutions of the polymer were treated with a mixed-bed ion exchanger (Merck Type V) and then titrated with n/100 methanolic KOH. A pH-meter of the kind manufactured by Messrs. Knick, Model 52 (calomel glass electrode) was used as the measuring instrument. The results obtained are set out in Table 2 as milliequivalents of acid groups in 100 g. of polymer (mval. acid gr./100 g. PM).

TABLE 2

| Polymer of Example No. | Extinction after 2 hours | Extinction after 4 hours | Extinction after 40 hours | mval. acid gr./ 100 g. PM |
|---|---|---|---|---|
| 1 | 0.156 | 0.196 | 0.533 | 4.2 |
| 2 | 0.122 | 0.166 | 0.423 | 5.9 |
| 3 | 0.107 | 0.134 | 0.358 | 8.5 |
| 4 | 0.102 | 0.124 | 0.336 | 14.2 |
| 5 | 0.089 | 0.097 | 0.290 | 19.8 |
| 6 | 0.072 | 0.085 | 0.263 | 25.2 |
| 7 | 0.107 | 0.142 | 0.360 | 19.2 |
| 8 | 0.091 | 0.112 | 0.318 | 21.8 |
| 9 | 0.088 | 0.100 | 0.298 | 21.0 |
| 10 | 0.103 | 0.123 | 0.346 | 19.4 |
| 11 | 0.212 | 0.320 | 0.680 | 2.2 |

Preparation of the compound I of the formula

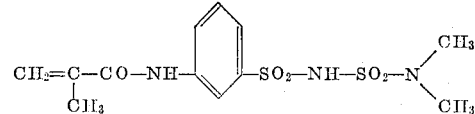

309 g. (1 mole) of the compound I

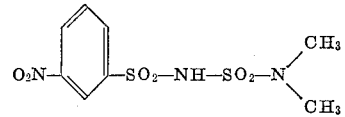

are added to a hot solution of 100 g. (1 mole) potassiumhydrogen carbonate in 1.1 liter water. After the addition of 60 g. Raney-nickel hydrogenation is effected at a hydrogen pressure of 80 atmospheres excess pressure and at a temperature of 80° C., until the amount of hydrogen is absorbed which is necessary for the reduction of the nitro group. After cooling and releasing of the pressure the catalyst is removed by filtration. Thereafter 89 g. (1.05 mole) of sodium hydrogen carbonate and as a polymerization inhibitor 3 g. of thiosemicarbazide are added to the filtrate and then 110 g. (1.05 mole) methacrylic acid chloride are added dropwise to the filtrate at 5 to 10° C. within 2 to 3 hours while stirring vigorously. Stirring is continued while the temperature is allowed to raise to room temperature and thereafter for another 4 to 5 hours. The reaction mixture is then cooled to 0 to 5° C. The potassium salt of the formula

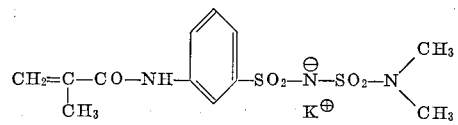

is precipitated and is filtered by suction and suspended in 1 liter of water. After the addition of 1 g. of thiosemicarbazide at a temperature of 45° C. 175 cm.³ of concentrated hydrochloride acid are dropped into the suspension. Thereby the free disulfimide is obtained. After stirring for another hour at 45° C. the mixture is cooled to 0° C., kept at this temperature for several hours and then the precipitate is filtered off.

The yield is 280 g. (80% of the theoretical). For further purification 150 g. of the obtained compound are dissolved in 100 cm.³ methanol and 125 cm.³ of water at elevated temperature after the addition of 0.25 g. of thiosemicarbazide. The solution is dissolved if necessary by adding a few grams of zinc dust and filtered. After cooling to 70° C. a mixture of 25 cm.³ of concentrated hydrochloric acid, 75 cm.³ of water are stirred into the solution which is then cooled to 0° C. and filtered after standing for some hours at this temperature. Yield: 135 g.; melting point: 151 to 153° C.

In an analoguous manner the following compounds were prepared:

III
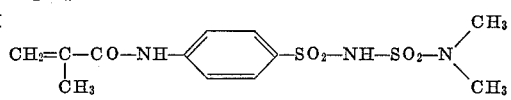
M.P. 179–180° C.

(IV)
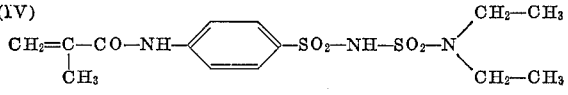
M.P. 178–181° C.

(V)
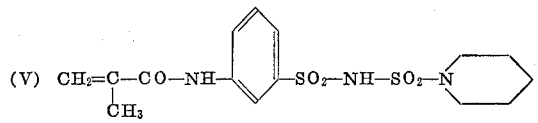
M.P. 157–163° C.

Example 12

Polymerization was carried out in an enamelled, double-walled vessel of 100 liters capacity. The vessel was equipped with a stirring mechanism, a reflux condenser, a nitrogen inlet and a thermometer, being connected to a water circuit for temperature control. Polymerization was carried out as in Examples 1 to 11.

The reaction mixture used consisted of 65.5 liters of desalted water, 4.7 kg. of acrylonitrile, 275 g. of methyl acrylate, 35 g. of compound I (see Table 1), 22.5 g. of potassium persulfate, 112 g. of sodium pyrosulfite and 60 ml. of 20% sulfuric acid. On completion of polymerization, the fine grained polymer was isolated in a filter centrifuge and washed free of acid with desalted water. It was dried in vacuo at 60° C. The yield amounted to 89% and the K-value was 86.4. 100 g. of polymer contained 5.5 milliequivalents of acid groups.

A 27% spinning solution in dimethyl formamide was prepared from the polymer. The solution was pale yellow, completely clear and satisfactorily spinnable by a conventional dry-spinning process. After stretching and the standard after-treatment under heat, the filaments were whiter than filaments produced under the same conditions from a comparison polymer without an acid co-component. In a heating test lasting 1 hour at 160° C., the filaments produced from the comparison polymer also turned much yellower. The filaments spun from the co-polymer according to the invention were dyeable in deep shades with basic Astrazon dyes and showed excellent fastness to light and to washing.

Example 13

The following reaction mixture was polymerized in the same reaction vessel and under the same conditions as in Example 12: 65 liters of desalted water, 4.35 kg. of acrylonitrile, 300 g. of methyl acrylate, 350 g. of compound I (see Table 1), 25 g. of potassium persulfate, 125 g. of sodium pyrosulfite and 4 g. of aluminium sulfate. The polymer was isolated and dried as described in Example 12. 4.64 kg. (93% yield) of polymer were obtained with a K-value of 82.6. The acid group content amounted to 23.7 milliequivalents in 100 g. of polymer.

The copolymer was dissolved in dimethyl formamide to form a 28% solution which was spun by a dry-spinning process. The filaments were stretched 1:4 in hot (98° C.) water and dried for 1 hour under tension at 70° C. They had an individual denier of 3.5 den., a high degree of whiteness and outstanding thermal stability (hardly any yellowing noticeable after 1 hour at 160° C.).

Examples 14–20

Acrylonitrile was copolymerized with various unsaturated N′-substituted N-(amidosulfonyl) - sulfonic acid amides and methyl acrylate in dimethyl formamide solution in a 50 ml. long-necked flask with a ground glass stopper. The flask was filled with the freshly prepared reaction mixture, closed and placed in a water bath heated to 35° C. The reaction mixture contained 65 parts of dimethyl formamide, 32.9 parts of acrylonitrile, 2.1 parts of methyl acrylate, 0.14 part of mono-tert.-butyl permaleate and 0.195 part of benzene sulfinic acid amide. Different quantities of co-components were present (see Table 3). After the reaction time of 14 hours, highly viscous, completely clear and colourless solutions were obtained. The polymer yield was determined by precipitation in methanol. The test results are set out in Table 3.

TABLE 3

| | Acid co-component | | | | |
|---|---|---|---|---|---|
| | Type + | Percent by weight in the monomer mixture | Conversion, percent | K-value | mval. acid gr./ 100 g. of polymer |
| Example No.: | | | | | |
| 14 | I | 2 | 82 | 76.4 | 6.2 |
| 15 | I | 4 | 79 | 80.6 | 12.7 |
| 16 | I | 6 | 75 | 85.2 | 20.6 |
| 17 | I | 8 | 73 | 89.7 | 27.3 |
| 18 | III | 2.5 | 83 | 76.8 | 8.2 |
| 19 | IV | 2.5 | 85 | 74.8 | 7.9 |
| 20 | V | 2.5 | 80 | 79.7 | 7.7 |

+ See Table 1.

Films prepared from the polymer solutions were dyeable in deep and very deep shades with basic Astrazon dyes, and underwent far less discolouration at 160° C. than comparison films which did not contain an acid co-component.

Example 21

A reaction mixture consisting of 75 parts of dimethyl acetamide, 23.5 parts of acrylonitrile, 1.5 parts of methyl acrylate, 0.6 part of compound V (see Table 1), 0.11 part of mono-tert.-butyl permaleate, 0.15 part of benzene sulfinic acid amide, 0.05 part of concentrated sulfuric acid and 0.6 part of water, was polymerised as described in Examples 14 to 20. After a reaction time of 20 hours at 25° C., a viscous, clear and colourless solution with a polymer content of 19.5% (78% yield) was obtained. The polymer had a K-value of 77.2 and 100 g. of polymer contained 6.9 milliequivalents of acid groups.

Example 22

75 parts of dimethyl sulfoxide, 23.5 parts of acrylonitrile, 1.5 parts of methyl acrylate, 0.6 part of compound III (see Table 1), 0.16 part of mono-tert.-butyl permaleate and 0.22 part of benzene sulfinic acid amide were used for polymerisation as described in Example 21. A polymer yield of 82% (K-value 92.1) was obtained after 8 hours at 25° C. The highly viscous solution was clear and colourless. Acid group content 7.3 mval./100 g. PM.

Example 23

Solution polymerisation on a semi-industrial scale was carried out in a 200-litre capacity, double-walled V4A-vessel equipped with a stirring mechanism, a thermometer and vacuum and nitrogen connections, connected to a water circuit for temperature regulation. The following components were introduced into the reaction vessel: 100.5 kg. of dimethyl formamide, 45.45 kg. of acrylonitrile, 3 kg. of methyl acrylate, 1.05 kg. of compound I (see Table 1), 225 g. of mono-tert.-butyl permaleate (in the form of a 50% paste in dimethyl phthalate), 345 g. of p-toluenesulfinic acid amide and 75 g. of concentrated sulfuric acid (the catalysts and compound I dissolved in dimethyl formamide). The reaction vessel was then briefly evacuated and a protective nitrogen pressure of 0.2 atm. was adjusted. Polymerisation was continued for 20 hours with intensive stirring. The temperature in the reaction medium fluctuated between 32° C. and 36° C. A highly viscous, clear and almost colourless solution containing 27.6% of polymer (79% conversion) was obtained. The polymer had a K-value of 84.8. The solution was diluted to 24% with dimethyl formamide (which contained a polymerisation inhibitor) and then passed through a falling-film evaporator where most of the unreacted monomers were removed under reduced pressure. Following distillation, the solution had a concentration of 28.8% and a residual monomer content of only 0.2% (acrylonitrile). It was completely clear, gel-free and, without being filtered, was satisfactorily spinnable by a dry-spinning process. The filaments showed a limited tendency to yellow after 1 hour at 160° C. and were dyeable in deep shades with basic Astrazon dyes. The acid group content amounted to 6.0 milliequivalents in 100 g. of polymer.

Example 24

The following mixture was polymerised as described in Example 23: 65 kg. of dimethyl formamide, 32.9 kg. of acrylonitrile, 2.1 kg. of methyl acrylate, 2.8 kg. of compound I (see Table 1), 160 g. of mono-tert.-butyl permaleate (in the form of a 50% paste) and 220 g. of p-toluenesulfinic acid amide. After 22 hours' polymerisation at 32° C.–35° C., a 28.4% clear, light and viscous solution was formed (yield: 75%, K-value: 83.7). As described above, this solution was then diluted, stabilised and distilled. After distillation, the solution had a concentration of 29.4% and a considerably lower viscosity (3100 poises at 20° C.) than a solution prepared from a copolymer which did not contain an acid co-component (4800 poises at 20° C.) although the K-values and concentrations were substantially the same. The filaments were spun and after-treated as described in Example 13. The acid group content amounted to 24.8 milliequivalents per 100 g. of polymer.

Example 25

50 kg. of dimethyl formamide, 20 kg. of vinylidene chloride, 28.85 kg. of acrylonitrile, 1.15 kg. of compound I (see Table 1), 150 g. of mono-tert.-butyl permaleate (in the form of a 50% paste), 230 g. of p-toluene sulfinic acid amide, 200 g. of toluene sulfonic acid and 700 ml. of water were used for polymerisation as described in Example 23. The temperature was kept between 34° C. and 37° C., the reaction being stopped after 28 hours. The yield amounted to 75%, the polymer concentration to 37.5% and the K-value to 79.4%. The solution was completely clear and almost colourless. Dilution to 33% was followed by distillation, after which the solution had a polymer concentration of 38.6% and a viscosity of 4600 poises at 20° C. To test the resistance to gelation of the highly concentrated solution, a sample was left standing for 2 weeks at room temperature (23° C.–27° C.) in a closed vessel and its viscosity was periodically measured.

No change in viscosity or clouding was visible during the test. The solution was satisfactorily dry-spun without filtration. The filaments had a high degree of whiteness and a greatly reduced flammability (28.1% chlorine content) and were readily dyeable with basic Astrazon dyes (acid group content: 6.3 milliequivalents per 100 g. of polymer).

What we claim is:

1. An acrylonitrile copolymer containing at least 50% of copolymerized acrylonitrile, 0.5 to 8% of a copolymerized N'-substituted N-(amidosulfonyl)-sulfonic acid amide of the general formula

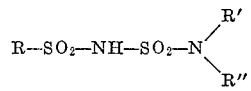

wherein R is an aliphatic, aromatic or araliphatic radical containing at least one copolymerizable olefinic double bond, R' and R" are lower aliphatic radicals or R' or R" together with the N-atom form a heterocyclic ring; the balance being one or more additional copolymerized ethylenically unsaturated comonomer.

2. The acrylonitrile copolymer of claim 1, said N-(amidosulfonyl)-sulfonic acid amide being the compound of the formula

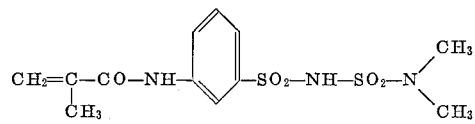

3. The acrylonitrile copolymer of claim 1, said N-(amidosulfonyl)sulfonic acid amide being the compound of the formula

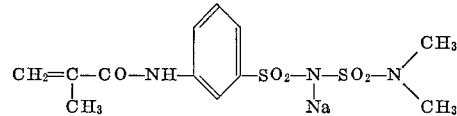

4. The acrylonitrile copolymer of claim 1, said N-(amidosulfonyl)-sulfonic acid amide being the compound of the formula

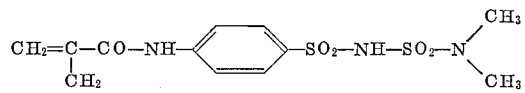

5. The acrylonitrile copolymer of claim 1, said N-(amidosulfonyl)-sulfonic acid amide being the compound of the formula

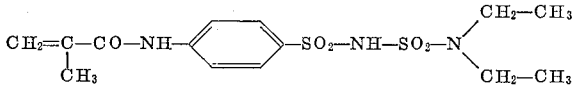

6. The acrylonitrile copolymer of claim 1, said N-(amidosulfonyl)-sulfonic acid amide being the compound of the formula

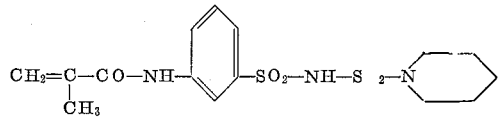

7. The acrylonitrile copolymer of claim 1, said additional copolymerized comonomer being methyl acrylate.

8. The acrylonitrile copolymer of claim 1, said additional copolymerized comonomer being vinylidene chloride.

9. A process for the production of readily dyeable acrylonitrile copolymers, which comprises copolymerizing at least 50% of acrylonitrile with from 0.5 to 8%, based on the total amount of monomers, of an N'-substituted N-

(amidosulfonyl)-sulfonic acid amide corresponding to the general formula

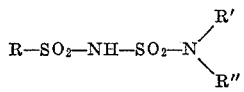

wherein R represents an aliphatic, aromatic or araliphatic radical with at least one copolymerisable olefinic double bond, and R' and R" represent lower aliphatic radicals or R' and R" together with the N-atom form a heterocyclic ring, the balance being one or more additional copolymerizable ethylenically unsaturated comonomer, said copolymerizing being effected in a liquid medium in the presence of a radical-forming catalyst at temperatures from 10 to 70° C.

10. The process of claim 9, said copolymerizing being effected in an aqueous medium at pH-values between 1 and 6 in the presence of a redox system consisting of persulfate and pyrosulfite, the ratio by weight of said persulfate to said pyrosulfite being from 1:3 to 1:5.

11. The process of claim 9, said copolymerizing being effected in an organic solvent in the presence of radical-forming catalysts.

12. The process of claim 11 said organic solvent being dimethylformamide.

13. The process of claim 11 said organic solvent being dimethylacetamide.

14. The process of claim 11 said organic solvent being dimethylsulfoxide.

References Cited

UNITED STATES PATENTS

| | | | |
|---|---|---|---|
| 2,566,162 | 8/1951 | Caldwell | 260—79.3 |
| 3,052,656 | 9/1962 | Greene et al. | 260—79.3 |

JAMES A. SEIDLECK, Primary Examiner

U.S. Cl. X.R.

8—55; 260—30.8, 32.6, 63, 78.5

UNITED STATES PATENT OFFICE
CERTIFICATE OF CORRECTION

Patent No. 3,497,476          Dated Feb. 24, 1970

Inventor(s) JENO SZITA ET AL.

It is certified that error appears in the above-identified patent and that said Letters Patent are hereby corrected as shown below:

| Column | Line | Error |
|---|---|---|
| 1 | 5 | "Lutzenkirchen" should read --- Luetzenkirchen ---. |
| 2 | 70 | "aliphatic" second occurrence should read --- araliphatic ---. |
| 3 | 5 | Delete "a". |
| 3 | 19 | "dyse" should read --- dyes ---. |
| 4 | 30 | In the formula " 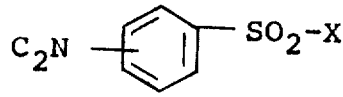 " should read --- 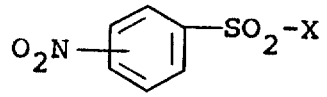 ---. |

FORM PO-1050 (10-69)

UNITED STATES PATENT OFFICE
CERTIFICATE OF CORRECTION

Patent No. 3,497,476          Dated Feb. 24, 1970

Inventor(s) JENO SZITA ET AL.          PAGE - 2

It is certified that error appears in the above-identified patent and that said Letters Patent are hereby corrected as shown below:

| Column | Line | Error |
|---|---|---|
| 4 | 40 In the formula | "  " should read --- 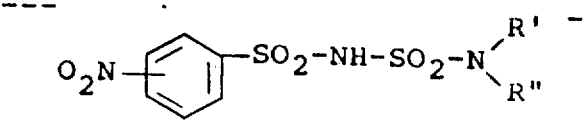 ---. |
| 7 | Table 1 Example 5 | "67.80" should read --- 65.80 ---. |
| 7 | Table 1 Example 6 | "67.40" should read --- 64.40 ---. |
| 7 | 51-56 | "and then titrated ... in 100 g. of polymer (mval. acid gr./100 g. PM)." should follow Table 2. |

UNITED STATES PATENT OFFICE
CERTIFICATE OF CORRECTION

Patent No. 3,497,476  Dated Feb. 24, 1970

Inventor(s) JENO SZITA ET AL.  PAGE - 3

It is certified that error appears in the above-identified patent and that said Letters Patent are hereby corrected as shown below:

| Column | Line | Error |
|---|---|---|
| 7 | Table 2 | "40 hours" should read --- 20 hours ---. |
| 12 | Claim 4 In the formula | " $CH_2=C-CO-NH-$ " with $CH_2$ branch should read --- $CH_2=C-CO-NH-$ --- with $CH_3$ branch. |
| 12 | Claim 6 In the formula | " $-SO_2-NH-S\ _2-N\bigcirc$ " should read --- $-SO_2-NH-SO_2-N\bigcirc$ ---. |

SIGNED AND
SEALED
AUG 25 1970

(SEAL)
Attest:

Edward M. Fletcher, Jr.
Attesting Officer

WILLIAM E. SCHUYLER, JR.
Commissioner of Patents